United States Patent Office 2,935,445
Patented May 3, 1960

2,935,445

N-TRICHLOROMETHYLTHIO-1,2,3-BENZOTRIAZINE-4-ONE AS A NOVEL NEMATOCIDE

John F. Hosler and William B. Hardy, Bound Brook, N.J., assignors to American Cyanamid Company, New York, N.Y., a corporation of Maine No Drawing. Application November 21, 1957
Serial No. 697,767

2 Claims. (Cl. 167—33)

This invention relates to a new and novel N-trichloromethylthio derivative of a six-membered heterocyclic compound, to its preparation and to biocidal compositions prepared therefrom. More particularly, it relates to a novel nematocidal compound which may be characterized by the formula:

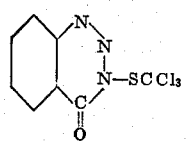

Heretofore, certain N-thiotrichloromethyl morpholines exhibit a disinfecting action on soil which may contain harmful organisms. Certain cyclic N-trichloromethylthio amides and imides, particularly those in which the $=N-SCCl_3$ is linked to two acyl groups, have been similarly used.

While such compounds may be effective in retarding or inhibiting growth of fungi, bacteria or insects, they possess no practical nematocidal properties when used in practical dilutions of 0.1% or less. There remains a demand for a compound which would exhibit useful nematocidal action at these dilutions. If available, such a compound would be highly beneficial in assisting to reduce agricultural crop loss due to the presence of harmful nematodes.

It is, therefore, an object of the present invention to provide a commercially useful material having effective nematocidal activity in practical, useable low concentrations. Other objects and advantages will become apparent from the ensuing description.

According to the invention, there is provided the novel compound, 3 - trichloromethylthio-1,2,3-benzotriazine-4-one. The latter compound, even when used in dilutions of less than 0.1%, unexpectedly demonstrates surprisingly effective nematocidal properties. The compound of this invention may be prepared by reacting 1,2,3-benzotriazine-4-one with perchloromethylmercaptan ($ClSCCl_3$) in the presence of aqueous sodium hydroxide at temperatures between about 0° C. and 10° C. The compound is readily recoverable as a solid, insoluble in water but soluble in a variety of organic solvents such as, for instance, acetone, ethyl alcohol, benzene, naphtha, kerosene, and ethyl acetate.

It is an advantage of the present invention, as previously stated, that the nematocidal compound characterized above is effective when employed in dilute concentrations. It is preferred, therefore, to incorporate such compound in a variety of suitable solid or liquid carriers or diluents. Such compositions can be prepared either as a suspension in a suitable non-solvent or as a dust. A suspension or dispersion of the N-trichloromethylthio derivative in a non-solvent, such as water, may be prepared for direct application to infested soils. Alternatively, a prepared suspension of the compound may be modified by the addition thereto of small amounts, usually from about 1 to about 5 parts, of a dispersing agent of any commercially available dispersing or surface active agent per 100 parts of the nematocidal compound. Examples of surface active compounds are: the sodium salt of polymerized propyl naphthylene sulfonic acid (Daxad 11) as formed by condensing formaldehyde from propyl naphthylene sodium sulfonate and the alkyl aryl ether alcohols, such as condensates of octyl or nonyl phenol and ethylene oxide, (such as Triton X–100).

The following examples are given for purposes of illustrating certain more specific details of the present invention. Unless otherwise noted, all parts are by weight.

EXAMPLE 1

*3-trichloromethyl-1,2,3-benzotriazine-4-one*

Two parts of sodium hydroxide are dissolved in 150 parts of water and the solution cooled to 5° C. To this solution is added 7.35 parts of 1,2,3-benzotriazine-4-one. When the latter has been dissolved, a solution of 9.30 parts of perchloromethylmercaptan in 50 parts (by volume) of hexane is added. The latter addition is done gradually over a thiry minute period at between 0° C. and 5° C. while stirring. In about one hour, the reaction is found to have gone to completion.

Desired product, which precipitates out of solution, is isolated by filtration and dried under vacuum. Its melting point is 142° C.–144° C. and it has a light yellow color appearance. On analysis, the following is obtained:

Calculated for $C_8H_4Cl_3N_3OS$: C, 32.4; H, 1.35; N, 14.2 and Cl, 35.8. Found: C, 32.4; H, 1.5; N, 14.3 and Cl, 36.0.

To demonstrate the nematocidal activity of the compound prepared above, the following example is presented.

EXAMPLE 2

An aqueous suspension of 100 Anguillula nematodes in 4 cc. water is placed in a vial containing 0.1% of the compound of Example 1. The vial is rotated for twenty hours. At the termination, the percent kill of nematodes in the vial is 100%.

While the compound of the present invention possesses markedly good nematocidal activity, it may also be used, if desired, as a fungicide. For instance, at concentrations as low as 0.01% there is a total kill of fungi, such as *Sclerotinia fructigena* and *Macrosporium sarcinaeforme*.

The quantity of inert carrier or diluent with respect to the nematocidal compound is not of critical importance. It has, however, been found that up to 10% by weight of the compound based on the weight of the inert carrier is generally sufficient. In most cases, not more than 5% of active ingredient can be employed.

We claim:

1. A method of controlling nematodes in the soil which comprises applying thereto N-trichloromethylthio-1,2,3-benzotriazine-4-one.

2. The compound of the formula:

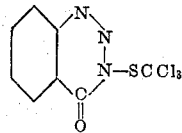

References Cited in the file of this patent

UNITED STATES PATENTS

| | | |
|---|---|---|
| 2,553,770 | Kittleson | May 22, 1951 |
| 2,553,771 | Kittleson | May 22, 1951 |
| 2,553,772 | Kittleson | May 22, 1951 |

(Other references on following page)

UNITED STATES PATENTS

| 2,553,773 | Cohen | May 22, 1951 |
| 2,553,774 | Hawley | May 22, 1951 |
| 2,553,775 | Hawley | May 22, 1951 |
| 2,553,776 | Kittleson | May 22, 1951 |
| 2,553,777 | Hawley | May 22, 1951 |
| 2,806,035 | Margot et al. | Sept. 10, 1957 |

OTHER REFERENCES

Kittleson: Science, vol. 115, pp. 84 to 86 (1952).

Chemical Abstracts, vol. 50, Subject Index, page 374s (1956).

Frear et al.: J. of Economic Entomology, vol. 40 (1947), pp. 136–41.